United States Patent [19]

Tominaga

[11] Patent Number: 5,334,433
[45] Date of Patent: * Aug. 2, 1994

[54] OPTICAL RECORDING MEDIUM

[75] Inventor: Junji Tominaga, Nagano, Japan

[73] Assignee: TDK Corporation, Tokyo, Japan

[*] Notice: The portion of the term of this patent subsequent to Oct. 12, 2010 has been disclaimed.

[21] Appl. No.: 996,821

[22] Filed: Dec. 28, 1992

[51] Int. Cl.$^5$ .............................................. B32B 3/00
[52] U.S. Cl. ...................................... 428/64; 428/65; 428/457; 428/913; 430/495; 430/945; 346/76 L; 346/135.1
[58] Field of Search .................. 428/64, 65, 457, 913; 430/495, 945; 346/76 L, 135.1

[56] References Cited

FOREIGN PATENT DOCUMENTS 63-56920 5/1983 Japan .

Primary Examiner—Patrick J. Ryan
Assistant Examiner—Elizabeth Evans
Attorney, Agent, or Firm—Watson, Cole Grindle & Watson

[57] ABSTRACT

The optical recording medium of the invention comprises a dielectric thin film 3, a recording thin film 4, and a reflective thin film 5 stacked on a surface of a substrate 2, the recording thin film 4 containing an inorganic compound which decomposes to release a gas upon heating. The medium can be used as a write-once type optical recording disk. The use of inorganic material to form the recording thin film provides improved light resistance and the dielectric thin film disposed between the substrate and the recording thin film prevents entry of water vapor and oxygen from the substrate side, ensuring long-term reliable storage both before and after recording. The use of a shape memory alloy to form the reflective thin film provides high recording sensitivity, allowing for recording with laser light at a low power of up to 8 mW, for example. Low power recording at 6 mW or less is possible particularly when a low-melting thin film is provided between the dielectric thin film and the recording thin film.

16 Claims, 1 Drawing Sheet

OPTICAL RECORDING MEDIUM

FIELD OF THE INVENTION

1. Field of the Invention

This invention relates to an optical recording medium.

2. Prior Art

Optical recording media, typically optical recording disks are of great interest as large capacity information recording media. Such optical recording media include those of the rewritable type such as phase change optical recording media and magneto-optical recording media and those of the write-once type such as pit formation type optical recording media.

DISCLOSURE OF THE INVENTION

An object of the present invention is to provide a write-once type optical recording medium of a novel structure.

This and other objects are achieved by the present invention as defined below from (1) to (16).

(1) An optical recording medium comprising a dielectric thin film, a recording thin film, and a reflective thin film stacked on a surface of a substrate in the described order, said recording thin film containing an inorganic compound which decomposes to release a gas upon heating.

(2) The optical recording medium of (1) wherein said inorganic compound releases a gas at a temperature of up to 300° C.

(3) The optical recording medium of (1) wherein said gas is oxygen or nitrogen.

(4) The optical recording medium of (1) wherein said inorganic compound is silver oxide or iron nitride.

(5) The optical recording medium of (4) wherein said silver oxide has an oxygen content of 5 to 50 at %.

(6) The optical recording medium of (4) wherein said iron nitride has a nitrogen content of 5 to 50 at %.

(7) The optical recording medium of (1) wherein said dielectric thin film contains silicon oxide or silicon nitride.

(8) The optical recording medium of (1) wherein said reflective thin film is comprised of a shape memory alloy, Al, Au, Pt or Cu.

(9) The optical recording medium of (1) which further comprises a low-melting thin film between said dielectric thin film and said recording thin film.

(10) The optical recording medium of (9) wherein said low-melting thin film is comprised of Sn, Zn, Pb, Bi, Tl, Te, Se, S, Al, Ga, Ge, Cd or I.

(11) The optical recording medium of (1) wherein said recording thin film is formed by a reactive sputtering technique.

(12) The optical recording medium of (11) wherein said recording thin film is formed by reactive sputtering in an oxygen gas containing atmosphere using Ag as a target.

(13) The optical recording medium of (12) wherein in the reactive sputtering, the flow rate of oxygen gas is 10 to 70% of the total flow rate of all gases.

(14) The optical recording medium of (11) wherein said recording thin film is formed by reactive sputtering in a nitrogen gas containing atmosphere using Fe as a target.

(15) The optical recording medium of (14) wherein in the reactive sputtering, the flow rate of nitrogen gas is 10 to 20% of the total flow rate of all gases.

(16) The optical recording medium of (12) wherein the pressure during the reactive sputtering is from $3 \times 10^{-1}$ to 1.0 Pa.

OPERATION

The optical recording medium 1 of the present invention comprises a dielectric thin film 3, a recording thin film 4, and a reflective thin film 5 on a surface of a substrate 2 and further includes a protective film 6 on the reflective thin film 5.

Recording is done by directing recording laser light to recording thin film 4 from the back surface of substrate 2 through substrate 2 and dielectric thin film 3 for heating recording thin film 4. Since the recording thin film contains an inorganic compound which decomposes to release a gas upon heating, exposure to recording laser light causes recording thin film 4 to release a gas. Where recording thin film 4 contains silver oxide, for example, the silver oxide decomposes into Ag and $O_2$ at about 160° C. Where recording thin film 4 contains iron nitride, for example, the iron nitride releases nitrogen at about 200° C. Then, as shown in FIGS. 1 and 2, the evolving gas creates a space 41 in recording thin film 4 and the pressure of the evolving gas causes a recess 51 to be created in the reflective thin film 5.

The space and recess thus created cause a change in optical parameters of portions where recording laser light is irradiated such as optical constants and light path length, resulting in a lowering of reflectivity. The recess 51 is toughened at the light reflecting face, which also causes a lowering of reflectivity.

The optical recording medium is a useful write-once type optical recording disk since the change of light reflectivity thus induced is irreversible, and the reflectivity of light in proximity to 780 nm is higher than about 50% before exposure to laser light, but decreases to lower than about 10% after exposure to laser light.

Further, since such a reflectivity change is available in the wavelength range of about 300 to 900 run by adjusting the thickness of the dielectric thin film or the like, short wavelength recording is possible which leads to a higher recording density. It will be understood that the dielectric thin film 3 has the function of a gas barrier for enhancing the reliability of an optical recording medium of the invention.

In an embodiment wherein the optical recording medium 1 of the invention further includes a low-melting thin film 7 between dielectric thin film 3 and recording thin film 4 as shown in FIG. 2, recording sensitivity is improved since low-melting thin film 7 is endothermic. This ensures that short signals like 3T signals are effectively recorded with low power laser light.

It is to be noted that Japanese Patent Publication No. 6920/1988 discloses "an optical recording material characterized by comprising an $Ag_2O$—$SiO_2$ system compound." This optical recording material utilizes the nature of an $Ag_2O$—$SiO_2$ system compound that blackens upon exposure to light and fades upon heating. It is different from the concept for the optical recording medium according to the present invention of stacking a dielectric thin film containing silicon oxide and a recording thin film containing silver oxide. Its behavior is also quite different from that of the present invention. The publication describes an initial reflectivity of less than 40% and a lowering of reflectivity after light exposure of only 8%, which suggests difficulty to use as optical recording medium.

ILLUSTRATIVE CONSTRUCTION

Now, the illustrative construction of the present invention is described in more detail.

Figure 1:
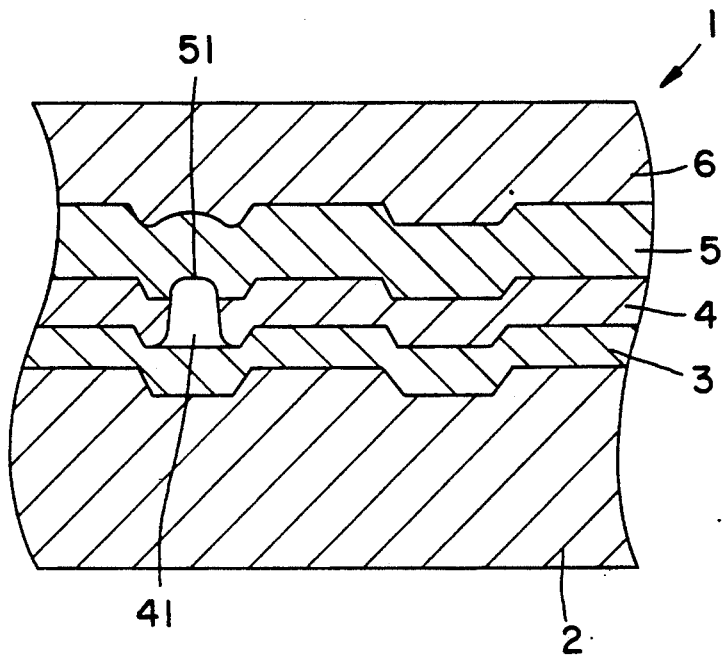
FIG. 1 is a fragmentary cross-sectional view of an optical recording medium according to one preferred embodiment of the present invention.

FIG. 1 shows an optical recording medium according to one preferred embodiment of the present invention. The optical recording medium 1 is shown as comprising a dielectric thin film 3, a recording thin film 4, and a reflective thin film 5 stacked on a surface of a substrate 2 and further comprising a protective film 6 on reflective thin film 5.

Substrate 2

Since optical recording medium 1 is designed such that recording light and reproducing light are directed to recording thin film 4 through substrate 2, substrate 2 is made of materials substantially transparent to the light, for example, resins and glass. Among others, resins are preferred to form substrate 2 because of ease of handling and low cost. Various resins including acrylic resins, polycarbonate resins, epoxy resins, and polyolefin resins may be used.

The substrate 2 is not particularly limited in shape and dimensions although it is generally of disk shape, typically having a thickness of about 0.5 to 3 mm and a diameter of about 50 to 360 mm. If necessary, substrate 2 on the surface may be provided with a predetermined pattern of grooves or the like for tracking and addressing purposes. In the illustrated embodiment, for example, the optical recording medium is provided with grooves within which recording light is directed.

Dielectric thin film 3

The dielectric thin film 3 may be made of various dielectric materials. The dielectric material used is not particularly limited. Where recording thin film 4 contains silver oxide, dielectric thin film 3 is made of silicon oxide whereby recording sensitivity is improved. The silicon oxide used herein preferably has a composition represented by $SiO_2$. Where recording thin film 4 contains iron nitride, dielectric thin film 3 is made of silicon nitride represented by $Si_3N_4$ whereby recording sensitivity is improved.

Additionally, the dielectric materials used herein include various transparent ceramics and glasses, for example, materials containing La, Si, O and N known as LaSiON, materials containing Si, Al, O and N known as SiAlON, and SiAlON materials further containing Y.

The thickness of dielectric thin film 3 may be properly selected in accordance with the index of refraction of a particular dielectric material used. Where the dielectric material used is $SiO_2$, for example, its thickness is preferably from 1,000 to 2,000 Å. Where a dielectric material having an index of refraction different from that of $SiO_2$ is used, its preferred thickness is determined by dividing the index of refraction of $SiO_2$ by the index of refraction of the dielectric material and multiplying the preferred thickness range for $SiO_2$ by the quotient.

If the thickness of dielectric thin film 3 is outside the preferred range, it would become difficult to provide a satisfactory reflectivity and a substantial change thereof.

In addition to the increase of recording sensitivity, dielectric thin film 3 has the function of a gas barrier for preventing entry of water vapor and oxygen from the substrate 2 side especially when substrate 2 is made of such resins as polycarbonate, thereby preventing deterioration of recording thin film 4.

Preferably, dielectric thin film 3 is formed by gas phase growth techniques such as sputtering and evaporation techniques.

Recording thin film 4

The recording thin film 4 contains an inorganic compound which decomposes to release a gas upon heating. Preferably the inorganic compound releases a gas at a temperature of up to 300° C. The type of gas released is not particularly limited although oxygen and nitrogen gases are preferred because these gases are stable in proximity of room temperature and nontoxic.

The inorganic compound that releases oxygen or nitrogen gas is preferably silver oxide or iron nitride. Where silver oxide is used, recording thin film 4 should preferably contain 5 to 50 atom %, especially 10 to 30 atom % of oxygen. Where iron nitride is used, recording thin film 4 should preferably contain 5 to 50 atom %, especially 10 to 30 atom % of nitrogen. Preferably, recording thin film 4 consists of silver oxide or iron nitride although any additional element such as Sn and Zn may be contained in a total content of up to about 10 atom %.

Preferably, the recording thin film has a thickness of 500 to 1,000 Å. Recording would become difficult with a thickness below the range whereas with a thickness beyond the range, reflectivity would become insufficient due to light absorption through the recording thin film.

The recording thin film 4 is preferably formed by gas phase growth techniques such as sputtering and evaporation techniques, especially by a reactive sputtering technique using oxygen or nitrogen gas as a reactive gas.

A recording thin film of silver oxide is formed by reactive sputtering in an atmosphere containing oxygen gas using Ag as a target. Preferably, oxygen gas is used in admixture with an inert gas such as Ar and the flow rate of oxygen gas is 10 to 70% of the total flow rate of all gases. If the oxygen gas flow rate is outside this range, the oxygen content of the recording thin film would deviate from the optimum range, failing to provide sufficient recording sensitivity.

A recording thin film of iron nitride is formed by reactive sputtering in an atmosphere containing nitrogen gas using Fe as a target. Preferably, nitrogen gas is used in admixture with an inert gas such as Ar and the flow rate of nitrogen gas is 10 to 20% of the total flow rate of all gases. If the nitrogen gas flow rate is outside this range, the nitrogen content of the recording thin film would deviate from the optimum range, failing to provide sufficient recording sensitivity.

The pressure during reactive sputtering for depositing silver oxide or iron nitride preferably ranges from $3 \times 10^{-1}$ to 1.0 Pa, more preferably from $5 \times 10^{-1}$ to $9 \times 10^{-1}$ Pa, most preferably from $5 \times 10^{-1}$ to $8 \times 10^{-1}$ Pa.

It is to be noted that an RF sputtering technique is preferred for reactive sputtering although a DC sputtering technique is acceptable.

Reflective thin film 5

The reflective thin film 5 is preferably made of metals and alloys and more preferably, reflective thin film 5 made of a shape memory alloy can provide higher recording sensitivity. Since the reflective thin film of shape memory alloy is more susceptible to deformation by recording light irradiation, formation of a recess 51 is easy. The composition of the shape memory alloy used is not particularly limited although Ni—Ti system alloys or copper system shape memory alloys are preferably used since they are relatively easy to manufacture. An especially preferred copper system shape memory alloy is a Cu—Zn—Al system alloy. With respect to the composition and properties of these shape memory alloys, reference is made to, for example, "Basis and Engineering of Copper and Copper Alloys", Japanese Copper Drawing Society, May 1988.

It is also possible that reflective thin film 5 be made of high reflectivity metals such as Al, Au, Pt, Cu and the like.

The reflective thin film 5 is preferably 300 to 1,500 Å thick. A thickness below the range is unlikely to provide sufficient reflectivity. A thickness beyond the range achieves only a slight improvement in reflectivity at the sacrifice of cost.

Preferably, reflective thin film 5 is formed by gas phase growth techniques such as sputtering and evaporation techniques.

Protective film 6

The protective film 6 is provided for the purposes of improving scratch resistance and corrosion resistance and preferably formed of various organic materials, especially radiation curable compounds or their compositions which are cured with radiation such as electron radiation and ultraviolet light.

The protective film 6 is usually about 0.1 to 100 μm thick. It may be formed by conventional techniques such as spin coating, gravure coating, spray coating, and dipping techniques.

Low-melting thin film 7

Figure 2:
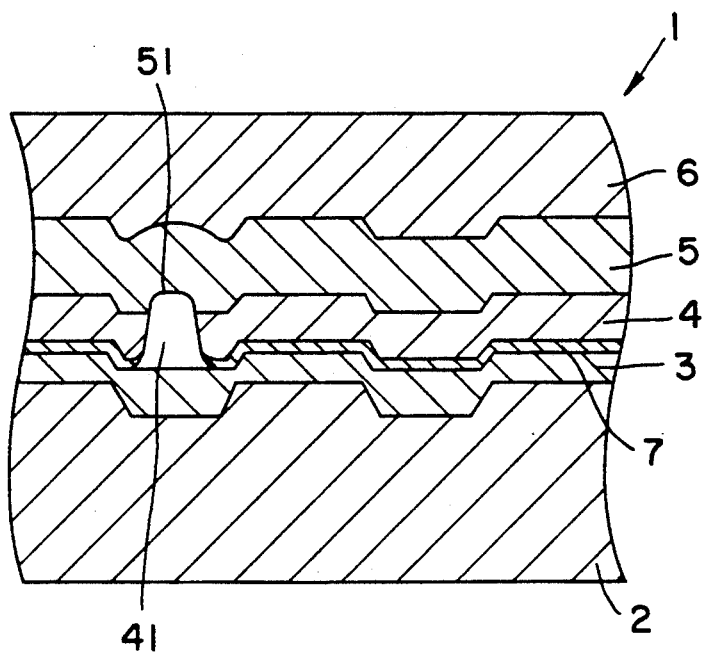
FIG. 2 is a fragmentary cross-sectional view of an optical recording medium according to another preferred embodiment of the present invention.

FIG. 2 shows an optical recording medium according to another preferred embodiment of the present invention. The optical recording medium 1 is shown in FIG. 2 as including a low-melting thin film 7 between dielectric thin film 3 and recording thin film 4.

The low-melting thin film 7 is provided for the purpose of improving recording sensitivity and preferably formed of materials having a melting point of about 200 to 800° C. These materials include, for example, Sn, Zn, Pb, Bi, Tl, Te, Se, S, Al, Ga, Ge, Cd, I, etc. and alloys and compounds thereof and a proper choice may be made among these materials.

It is also possible to form low-melting thin film 7 from a low-melting resins. These resins include, for example, nitrocellulose, polyimides, and fluorocarbons. When resins are used, the low-melting thin film is preferably formed by evaporation although spin coating is acceptable.

The low-melting thin film 7 is preferably 10 to 200 Å, especially 50 to 100 Å thick. Recording sensitivity improvement would become insufficient with a thickness below this range whereas a thickness beyond this range would fail to provide sufficient reflectivity due to increased light absorption.

Preferably, low-melting thin film 7 is formed by gas phase growth techniques such as sputtering and evaporation techniques.

It is to be noted that when the recording thin film 4 is formed on low-melting thin film 7, low-melting thin film 7 can diffuse into the recording thin film 4.

Change of reflectivity

When recording laser light is directed to the optical recording medium 1 constructed as shown in FIG. 1 from the back surface of substrate 2, the recording laser light transmitted by substrate 2 and dielectric thin film 3 heats recording thin film 4. The inorganic compound in recording thin film 4 is heated and thus decomposed to generate a gas. For example, where the inorganic compound is silver oxide, it is decomposed into Ag and $O_2$, evolving $O_2$ gas. Where the inorganic compound is iron nitride, it is decomposed into Fe and $N_2$, evolving $N_2$ gas. The pressure of the evolving gas causes a space 41 to be created within recording thin film 4.

The reflective thin film 5 is also stressed by the evolving gas so that a recess 51 is formed in reflective thin film 5. The reason why recording sensitivity becomes high or low power laser light writing becomes possible when reflective thin film 5 is made of a shape memory alloy is that reflective thin film 5 of shape memory alloy is more likely to form a recess 51.

In the embodiment of FIG. 2 having low-melting thin film 7, low-melting thin film 7 is heated and melted due to exposure to recording laser light, helping heat recording thin film 4.

Within space 41 created as a result of recording laser light irradiation, optical constants including index of refraction n (the real part of a complex index of refraction) and a coefficient of extinction k (the imaginary part of a complex index of refraction) become changed from those in recording thin film 4, and the light path length is changed due to the formation of recess 51, resulting in changes of multiple reflection conditions. A substantial lowering of reflectivity thus occurs where recording laser light is irradiated.

The recess 51 is estimated from reflectivity changes to be about 300 to 500 Å deep. The recess 51 is toughened at its light reflecting face. It is believed that roughening is caused by bubbles of gas evolving as a result of decomposition of the inorganic compound. This toughening also contributes to a lowering of reflectivity. The state of roughening can be affirmed by means of a scanning electron microscope (SEM).

Medium structure

Although the embodiments wherein the present invention is applied to optical recording media of the one side recording type have been described, the present invention is also applicable to optical recording media of the double side recording type. The present invention is applied to optical recording media of the double side recording type by mating a pair of substrates 2 such that recording thin films 4 are sealed inside.

Also contemplated herein is a medium of the one side recording type having a protective plate adhesively bonded to the protective film 6. The protective plate used herein may be of the same material as substrate 2 although other materials may be used because the protective plate need not be transparent.

EXAMPLE

Examples of the present invention are given below by way of illustration.

EXAMPLE 1

An optical recording disk sample No. 1 of the construction shown in FIG. 1 was fabricated by forming a dielectric thin film 3 of silicon oxide, a recording thin film 4 of silver oxide, a reflective thin film 5 and a protective film 6 of UV curable resin on a surface of a substrate 2.

The substrate 2 used was a disk having a diameter of 133 mm and a thickness of 1.2 mm injection molded from polycarbonate resin with grooves configured at the same time.

The dielectric thin film 3 was formed to a thickness of 1,000 Å by sputtering using $SiO_2$ as a target.

The recording thin film 4 was formed to a thickness of 600 Å by reactive RF sputtering in an atmosphere containing oxygen gas and Ar gas. The sputtering pressure was $5.5 \times 10^{-1}$ Pa and the flow rates of oxygen and Ar gases were both 10 SCCM. The target used was Ag and the sputtering power was 200 W. The composition of recording thin film 4 was analyzed by Auger spectroscopy to find that it consisted of 10 atom % of oxygen and the balance of Ag.

The reflective thin film 5 was formed to a thickness of 1,000 Å by sputtering using a Cu—Zn—Al alloy as a target.

The protective film 6 was formed by applying a UV curable resin by a spin coating technique and exposing the resin to UV for curing. It was 5 μm thick at the end of curing.

For sample No. 1, CD signals (3T, 5T, 7T, 9T and 11T) were recorded and reproduced. Laser light of 8 mW was directed for recording and laser light of 0.5 mW directed for reproduction. The laser light had a wavelength of 780 nm.

The results that unrecorded portions had a reflectivity of 50% and recorded portions had a reflectivity of 10% indicated the possibility to use as an optical recording disk.

Sample No. 1 was subjected to a storage durability test of storing for 1,000 hour at 60° C. and RH 80%. No substantial increase of error rate was found.

EXAMPLE 2

An optical recording disk sample No. 2 was fabricated in the same manner as sample No. 1 of Example 1 except that the reflective thin film was Al of 1,000 Å thick and the recording thin film had a thickness of 800 Å.

Sample No. 2 was subjected to the same recording/reproducing test as in Example 1 to find that unrecorded portions had a reflectivity of 55% and recorded portions had a reflectivity of 15%, indicating the possibility to use as an optical recording disk. Approximately equal results were obtained when Al was replaced by Au, Pt or Cu.

EXAMPLE 3

An optical recording disk sample No. 3 of the construction shown in FIG. 2 was fabricated by disposing a low-melting thin film 7 between dielectric thin film 3 and recording thin film 4.

The low-melting thin film 7 was formed to a thickness of 50 Å by sputtering using Sn as a target.

The components other than low-melting thin film 7 were the same as in sample No. 1 fabricated in Example 1.

Sample No. 3 was recorded and reproduced using recording laser light having a power of 6 mW lower by 2 mW than that used for sample No. 1 and reproducing laser light having a power of 0.5 mW. There was found a reflectivity change as in sample No. 1.

EXAMPLE 4

An optical recording disk sample No. 4 was fabricated in the same manner as sample No. 1 of Example 1 except that the recording thin film 4 was formed of iron nitride and the dielectric thin film 3 was formed of silicon nitride.

The recording thin film 4 was formed to a thickness of 800 Å by reactive RF sputtering in an atmosphere containing nitrogen gas and Ar gas. The sputtering pressure was $5.5 \times 10^{-1}$ Pa, the flow rate of nitrogen gas was 1 SCCM and the flow rate of Ar gas was 10 SCCM. The target used was Fe and the sputtering power was 200 W. The composition of recording thin film 4 was analyzed by Auger spectroscopy to find that it consisted of 10 atom % of nitrogen and the balance of Fe.

The dielectric thin film 3 was formed to a thickness of 1,000 Å by sputtering using $Si_3N_4$ as a target.

For sample No. 4, CD signals (3T, 5T, 7T, 9T and 11T) were recorded and reproduced. Laser light of 12 mW was directed for recording and laser light of 0.5 mW directed for reproduction. The laser light had a wavelength of 780 nm.

The results that unrecorded portions had a reflectivity of 58% and recorded portions had a reflectivity of 20% indicated the possible use as an optical recording disk.

In a storage durability test as used for sample No. 1, similar results were obtained.

EXAMPLE 5

An optical recording disk sample No. 5 of the construction shown in FIG. 2 was fabricated by disposing a low-melting thin film 7 between the dielectric thin film 3 and the recording thin film 4.

The low-melting thin film 7 was formed in the same manner as sample No. 3 of Example 3 while the remaining components were the same as sample No. 4 of Example 4.

Sample No. 5 was recorded and reproduced using recording laser light having a power of 8 mW lower by 4 mW than that used for sample No. 4 and reproducing laser light having a power of 0.5 mW. There was found a reflectivity change as in sample No. 4.

ADVANTAGES

The optical recording media of the invention can be useful optical recording disks. In the invention, the use of an inorganic material as the recording thin film material provides very high light resistance and the dielectric thin film disposed between the substrate and the recording thin film prevents entry of water vapor and oxygen from the substrate side, ensuring long-term reliable storage both before and after recording.

Where a shape memory alloy is used as the reflective thin film material, there is available sufficiently high recording sensitivity to record with laser light at a low power of up to 8 mW, for example. Low power recording at 6 mW or less is possible particularly when a low-melting thin film is provided between the dielectric thin film and the recording thin film.

I claim:

1. An optical recording medium comprising a dielectric thin film, a recording thin film, and a reflective thin film stacked on a surface of a substrate in the described order, said recording thin film containing an inorganic compound which decomposes to release a gas upon heating.

2. The optical recording medium of claim 1 wherein said inorganic compound releases a gas at a temperature of up to 300° C.

3. The optical recording medium of claim 1 wherein said gas is oxygen or nitrogen.

4. The optical recording medium of claim 1 wherein said inorganic compound is silver oxide or iron nitride.

5. The optical recording medium of claim 4 wherein said silver oxide has an oxygen content of 5 to 50 at %.

6. The optical recording medium of claim 4 wherein said iron nitride has a nitrogen content of 5 to 50 at %.

7. The optical recording medium of claim 1 wherein said dielectric thin film contains silicon oxide or silicon nitride.

8. The optical recording medium of claim 1 wherein said reflective thin film is comprised of a shape memory alloy, Al, Au, Pt or Cu.

9. The optical recording medium of claim 1 which further comprises a low-melting thin film between said dielectric thin film and said recording thin film.

10. The optical recording medium of claim 9 wherein said low-melting thin film is comprised of Sn, Zn, Pb, Bi, Tl, Te, Se, S, Al, Ga, Ge, Cd or I.

11. The optical recording medium of claim 1 wherein said recording thin film is formed by a reactive sputtering technique.

12. The optical recording medium claim 11 wherein said recording thin film is formed by reactive sputtering in an oxygen gas containing atmosphere using Ag as a target.

13. The optical recording medium of claim 12 wherein in the reactive sputtering, the flow rate of oxygen gas is 10 to 70% of the total flow rate of all gases.

14. The optical recording medium of claim 12 wherein the pressure during the reactive sputtering is from $3 \times 10^{-1}$ to 1.0 Pa.

15. The optical recording medium of claim 11 wherein said recording thin film is formed by reactive sputtering in a nitrogen gas containing atmosphere using Fe as a target.

16. The optical recording medium of claim 15 wherein in the reactive sputtering, the flow rate of nitrogen gas is 10 to 20% of the total flow rate of all gases.

* * * * *